Dec. 16, 1941.  M. A. BUCCELLI ET AL  2,266,409
MEASURING TABLE
Filed Dec. 19, 1939  2 Sheets-Sheet 1

INVENTORS:
MICHAEL A. BUCCELLI
ANGELO A. FERRARI
STANLEY KELLER
BY
Thomson & Thomson
ATTORNEYS Dec. 16, 1941.   M. A. BUCCELLI ET AL   2,266,409
MEASURING TABLE
Filed Dec. 19, 1939   2 Sheets-Sheet 2
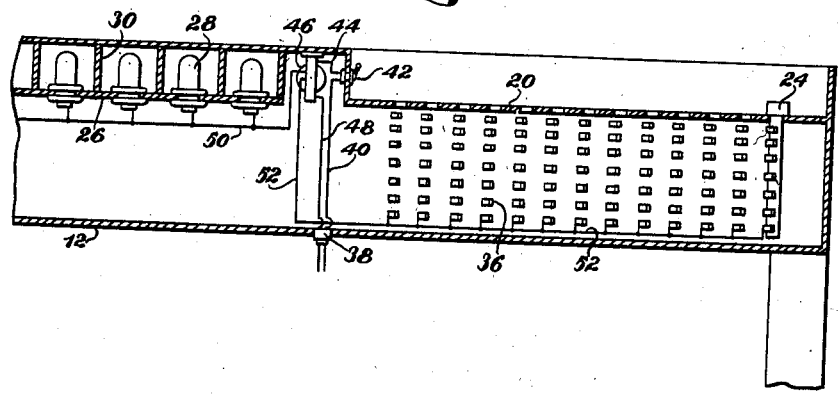
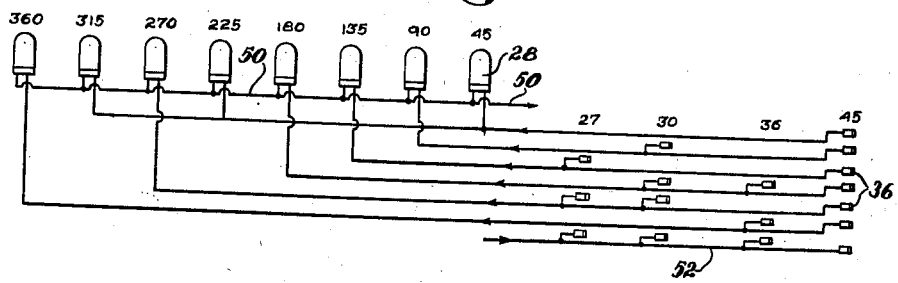
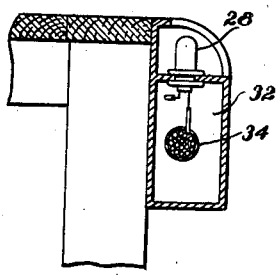
INVENTORS:
MICHAEL A. BUCCELLI
ANGELO A. FERRARI
STANLEY KELLER
BY Thomson & Thomson
ATTORNEYS Patented Dec. 16, 1941

2,266,409

UNITED STATES PATENT OFFICE 2,266,409

MEASURING TABLE

Michael A. Buccelli, Angelo A. Ferrari, and Stanley Keller, Boston, Mass.

Application December 19, 1939, Serial No. 310,086

1 Claim. (Cl. 33—76)

This invention relates to improvements in a measuring table and more particularly to a device adapted to be applied to the edge of a table on which goods such as curtains are laid out to be measured and cut into uniform sizes, in which the device automatically indicates measurements heretofore determined by manual operations.

In certain trades, such as for example that of curtain manufacture, it is customary practice to lay out the material for cutting on long measuring tables, and to manually measure off the various lengths of pieces which must be cut off. For example, the goods laid out the entire length of a long table are manually marked to be cut at every forty-five inches or some other desired size.

It is an object of our invention to provide automatic measurement indications for a measuring table whereby more accurate measurements are obtained more quickly with a consequent saving in material and in time.

It is an object of our invention to provide a measuring table provided with means for automatically indicating a desired measurement repeated progressively along the length of the table.

It is further an object to indicate the measurements by a series of light slots arranged along an edge of the table, and to provide means for selectively illuminating certain of said light slots which are uniformly spaced at the desired interval.

A still further object is the provision of a control unit electrically connected to a series of light bulbs each of which is associated with a light slot adjacent an edge of the table, which control unit is designed to take care of a plurality of different sizes, any one of which may be individually selected by the operator.

In the drawings:

Fig. 4 is a vertical section taken on the plane indicated 4—4 in Fig. 3;

Fig. 5 is a vertical section taken on the plane indicated 5—5 in Fig. 3; and

Fig. 6 is a circuit diagram showing the connections for one series of the lights.

Figure 1:
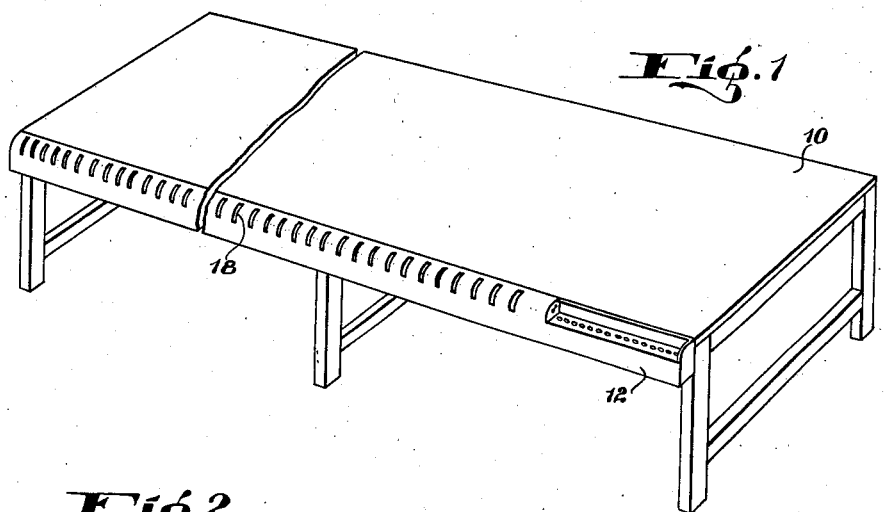
Fig. 1 is a perspective view of a table having the automatic measuring device installed along an edge.
Figure 2:
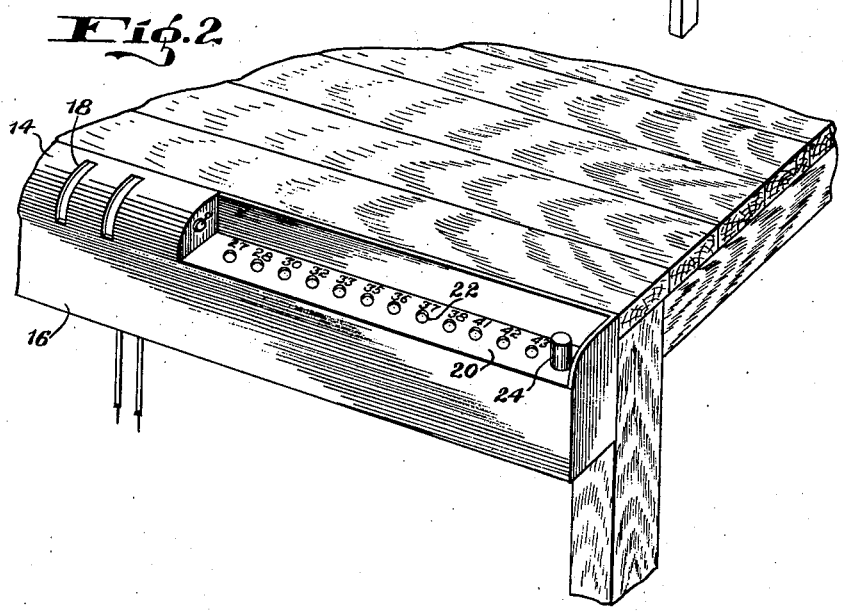
Fig. 2 is an enlarged perspective view of one end of the table and showing the control unit.
Figure 3:
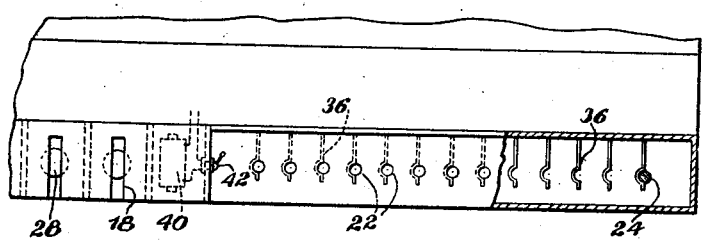
Fig. 3 is a fragmentary plan view of one end of the measuring device.

The table 10 is preferably a relatively long table that is wide enough to take care of the width of the goods which are to be measured. For example, a suggested length of table might be thirty feet. Secured to one longitudinal edge of the table is a casing 12 which extends the entire length of the table. The top wall 16 of the casing is flush with the surface of the table and is curved to merge smoothly into the vertical front wall. Transversely disposed in the rounded marginal edge, a plurality of slots 18 are provided which are spaced at intervals in accordance with the sizes and differences between the sizes to be measured. For example, the slots may be uniformly spaced one inch apart or may be irregularly spaced to suit particular requirements. At the right hand end of the casing the rounded top wall is cut away and a flat plate 20 is provided spaced below the top surface of the table. A plurality of openings 22 are formed in the plate 20 each of which is marked in accordance with the particular dimension to be measured. For example, such dimensions may include the customary sizes which are measured in the manufacture of curtains, such as twenty-seven inches, twenty-eight inches, thirty-five inches, forty-five inches, etc. The openings 22 are adapted to receive a plug 24 which will serve to complete the electrical circuits to indicate the proper measurement repeatedly along the length of the table, as hereinafter described.

Referring to Fig. 4, the casing 12 is provided with a supporting plate 26 on which are mounted, at spaced intervals, a series of light bulbs 28 each of which is positioned adjacent one of the light slots 18. Partition members 30 may be provided between each pair of light bulbs so that each light bulb will control the illumination of a single slot 18. The chamber 32 in the lower part of the casing 12 receives a cable of wires 34 which are connected to the series of light bulbs. At the right hand end of the casing 12, in the chamber beneath the plate 20, a plurality of contacts 36 are provided adapted to make contact with the plug 24 in order to cause the illumination of a selected series of the light bulbs. Electrical current is transmitted to the casing through an input plug receptacle 38. The positive lead-in wire 40 is connected to a switch 42 which in turn is connected by wire 44 to a transformer 46 which serves to reduce the voltage so that low voltage light bulbs may be employed. The negative lead-in wire 48 is connected to the opposite terminal of the transformer. The wire 52 is connected from one terminal of the secondary side to one of the contact points adjacent each of the openings 22 of the control unit as illustrated. The wire 50 is connected to the other terminal of the secondary side of the transformer and to each of the light bulbs.

It is not considered essential to disclose all of the electrical connections from the bulbs to the contacts 36, but reference will be made to the example given in Fig. 5 in which it is assumed that forty-five inches is the dimension to be measured. In this case, the series of light bulbs 28 at intervals of forty-five inches from the right hand end of the table throughout the entire length of the table will be illuminated; for example, the eight lights at forty-five inches, ninety inches, one hundred and thirty-five inches, one hundred and eighty inches, two hundred and twenty-five inches, two hundred and seventy inches, three hundred and fifteen inches, and three hundred and sixty inches from the end of the table. It is possible to reduce the number of contacts so that eight contact points will not be required by combining those lights which do not repeat on other measurements to be indicated; for example, the lights at forty-five inches, two hundred and twenty-five inches, and three hundred and fifteen inches are connected in this example. This diagram also indicates that a single light may be connected to several of the contact points. For example, the bulb which is spaced at two hundred and seventy inches from the end of the table must light to indicate the measurement of twenty-seven inches, thirty inches, and forty-five inches. In order to disclose the use and operation of the measuring device reference may be made to its use in connection with the trade of curtain manufacture. In this field it is customary practice to employ measuring tables which may be thirty to sixty feet long and four to six feet wide. The yard goods are laid out on the table for cutting and marked measurements are manually made with the aid of measuring sticks which are cut to predetermined sizes or by rules fixed to the edge of the table and marked by nails, thumb tacks, or clamps. It will be understood that only one size of curtain will be cut at a time, but that different sizes are cut from time to time in accordance with the orders received.

The measuring device herein disclosed takes the place of the manual measuring operation. It is only necessary to make the proper connections by means of the plug 24 or some similar control device in order automatically to obtain a visual indication at points spaced along an edge of the table so that the selected measurement may be repeatedly made throughout the length of the table. By shifting the plug 24 a different size may be measured whenever desired. More accurate measurements can be made by the use of the device with a consequent saving in stock and a considerable saving in time which is otherwise lost when a change is made in the size to be cut.

We claim:

An automatic measurement indicating device adapted to be installed along an edge of a measuring table comprising a casing having a plurality of spaced indicating openings arranged in a row adjacent the edge of the table, a light bulb mounted in said casing in proximity to each of said indicating openings, a control unit, electrical connections from said control unit to said light bulbs and means associated with said control unit for selectively causing the illumination of a plurality of said light bulbs which are spaced apart at equal intervals to obtain a visual indication at certain of said indicating points whereby a desired measurement may be repeatedly made along the entire length of the table.

MICHAEL A. BUCCELLI.
    ANGELO A. FERRARI.
    STANLEY KELLER.